Dec. 22, 1953     F. S. JONES     2,663,116
ANIMAL TRAP
Filed May 28, 1951     2 Sheets-Sheet 1
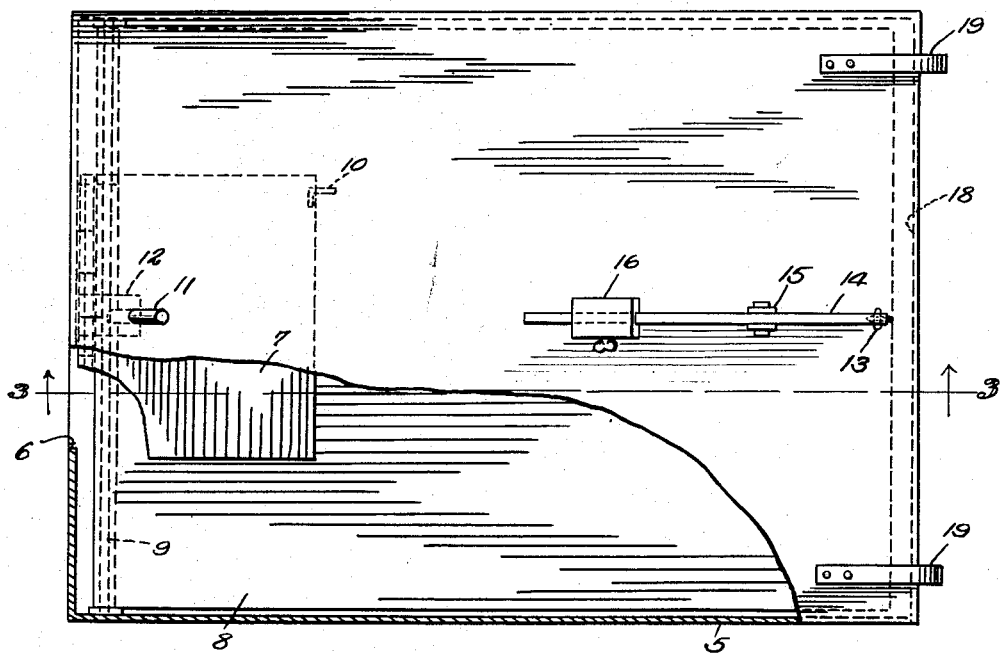
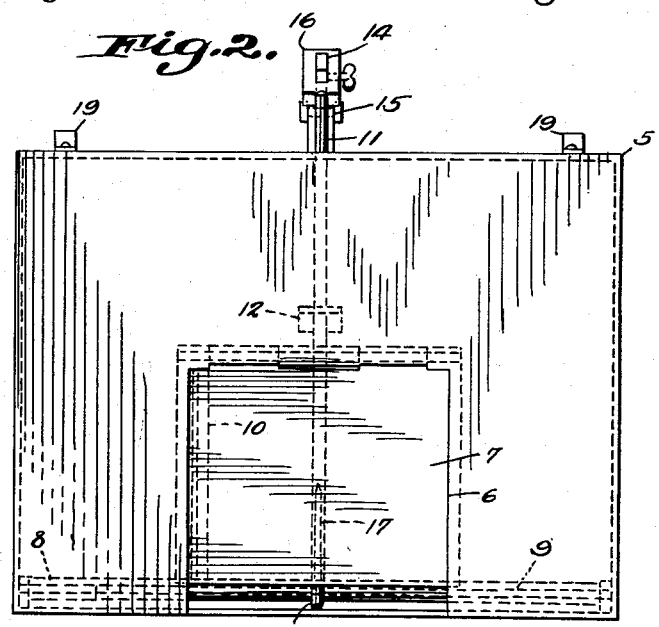
F. S. Jones
INVENTOR,
BY *Snow & Co.*
ATTORNEYS.

Dec. 22, 1953    F. S. JONES    2,663,116
ANIMAL TRAP

Filed May 28, 1951    2 Sheets-Sheet 2

F. S. Jones
INVENTOR,

BY C.A.Snow&Co.
ATTORNEYS.

Patented Dec. 22, 1953

2,663,116

UNITED STATES PATENT OFFICE 2,663,116

ANIMAL TRAP

Floyd Smith Jones, Durham, N. C.

Application May 28, 1951, Serial No. 228,684

1 Claim. (Cl. 43—61)

This invention relates to an animal trap, an important object of the invention being to provide an animal trap, wherein the trap will be operated by the weight of the animal passing into the trap to remove the bait therefrom, the construction and operation of the trap being such that the animal will not be injured by the trap.

Another important object of the invention is to provide a trap of this character wherein a treadle is provided onto which the animal passes in attempting to remove the bait, the treadle operating certain mechanism for closing the pivoted door of the trap, preventing the escape of the animal from the trap.

Still another object of the invention is to provide a trap which will be free of springs and weights usually employed in trap construction and which operate jaws which frequently injure the animal trapped.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a plan view of a trap constructed in accordance with the invention, a portion of the top of the trap having been broken away illustrating the interior of the trap.

Fig. 2 is a front elevational view of the trap.

Figure 3:
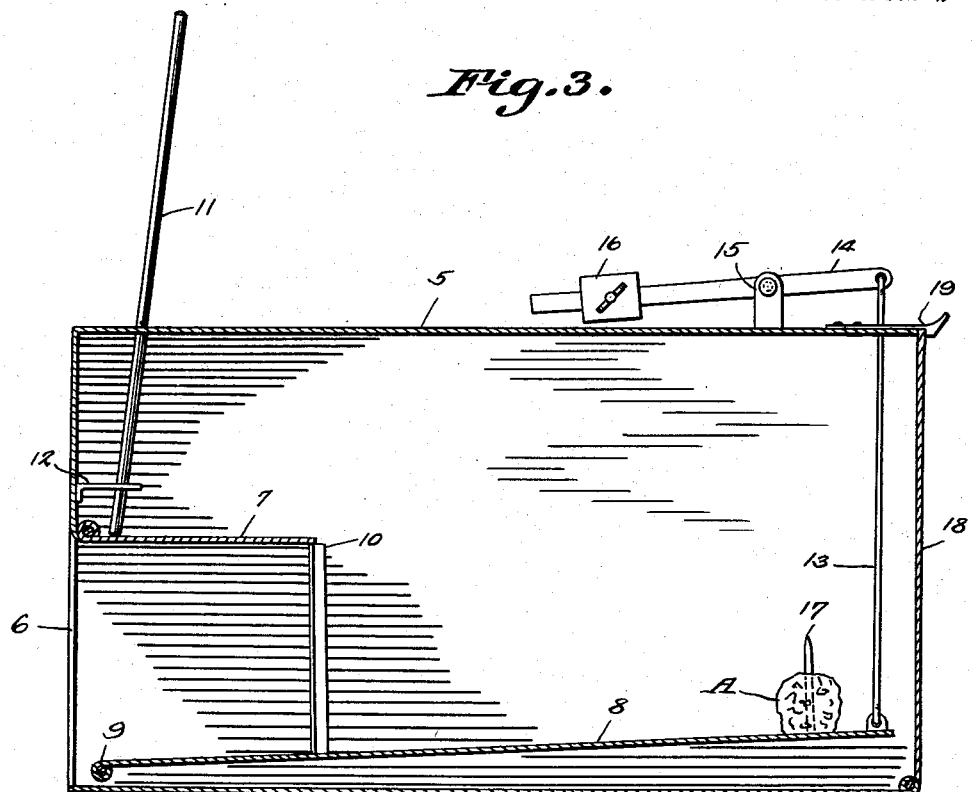
Fig. 3 is a sectional view taken on the line 3—3 of Fig. 1.
Figure 4:
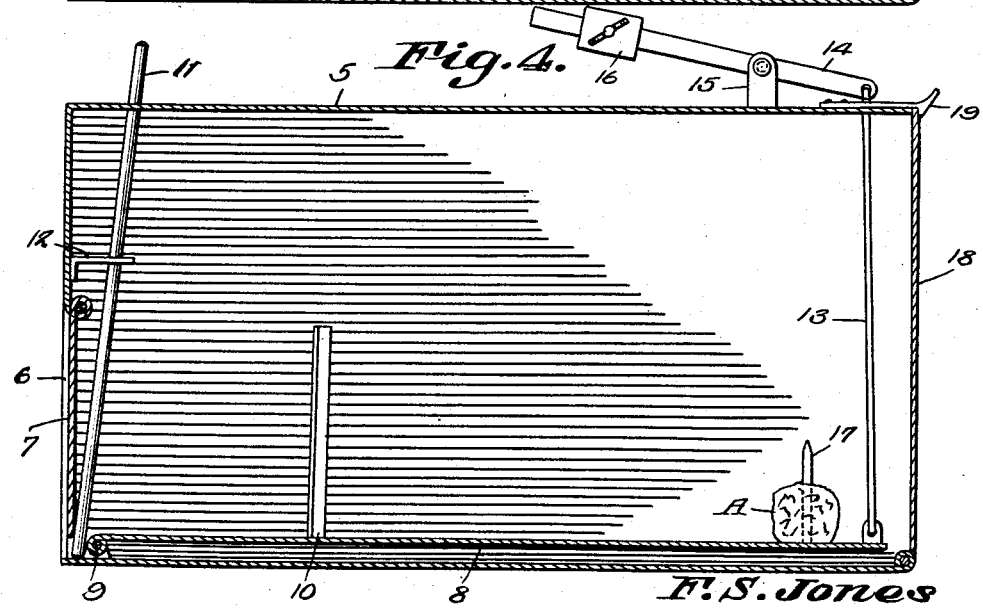
Fig. 4 is a longitudinal sectional view through the trap illustrating the position of the locking rod and trap closure when operated by an animal entering the trap.

Referring to the drawing in detail, the trap comprises a box-like body indicated by the reference character 5, the front of the body being provided with an entrance opening 6 which is closed by the closure 7 which is pivotally mounted along its upper edge to the body so that it will fall by gravity to its closed position.

Mounted within the body is the treadle 8 formed of a wide strip of sheet metal material pivoted along its forward end at 9, the rear end of the treadle being free to move vertically within the body.

Extending upwardly from the treadle 8 is the vertical bar 10, the bar 10 being secured to the treadle and disposed adjacent to one edge of the closure 7, when the closure is in its elevated position, thereby providing a support for holding the closure in its open position, when the trap is set.

The reference character 11 indicates the lock rod of the trap which extends through an opening in the top 5 and also passes through an opening in the guide bracket 12, which is secured to the inner surface of the front of the trap, the openings through which the lock rod 11 moves, being disposed so that the lock rod 11 moves at an oblique angle with respect to the top of the trap, the rod 11 being of a length to extend to a point between the pivot 9 and free edge of the closure 7, when the closure has been moved to its closed position, thereby preventing the closure from swinging inwardly after it has been moved to its closed position by the animal passing into the trap.

The reference character 13 indicates a rod that has pivotal connection with the treadle 8 at the free end thereof, the rod 13 extending through an opening in the top of the body portion 5 where it has pivotal connection with lever 14.

The lever 14 is pivotally mounted on the bracket 15 rising from the top of the body of the trap, the lever 14 being provided with an adjustable weight 16, which may be moved longitudinally of the lever to normally hold the treadle 8 in a set position.

At the rear end of the treadle 8 is a prong 17 that provides the bait holder for the trap, the bait in the present showing being indicated by the reference character A.

Pivotally mounted at the rear of the body is the closure 18 which is held closed by the latch 19, the closure 18 closing the rear of the body under normal conditions. It is obvious that when the closure 18 has been moved to its open position the animal trapped within the body portion may be readily removed and the trap reset.

In operation, the trap is set by moving the closure 7 to its horizontal position, as shown by Fig. 3 of the drawings, the lock rod 11 having been moved to its uppermost position with its lower end resting directly on the closure 7. When the closure 7 has been moved to its set position and the treadle 8 has been swung upwardly, the vertical bar 10 will provide a support for the closure 7 to normally hold the closure 7 in its open position.

As an animal enters the trap in an attempt to remove the bait from the prong 17, the weight of the animal will move the treadle 8 downwardly disengaging the vertical bar 10 and the closure 7 will move by gravity to a closed position, trapping the animal in the body.

It will of course be understood that the weight 16 will be adjusted to such position on the lever 14 that the treadle 8 will operate only when the animal has moved to a position adjacent to the bait to remove the bait.

Having thus described the invention, what is claimed is:

An animal trap comprising, a hollow rectangular body having an ingress opening extending through a vertical wall thereof, a pivoted treadle mounted within the body for movement in a vertical arcuate path, the pivot point of said treadle being adjacent the ingress opening, a door hingedly carried by the body above the ingress opening for movement in an arcuate path from an inactive substantially horizontal position above the treadle in which the ingress opening is open to an active substantially vertical position adjacent the treadle in which the ingress opening is closed, a post carried by the treadle and extending upwardly therefrom for movement therewith from an active position beneath the door to an inactive position out of the path of movement of the door, said treadle being provided with an adjustable counterweight arrangement such that the treadle cannot ordinarily be pivoted by an animal thereon until the said animal has passed the said post, and means to hold the door in closed position relative to the ingress opening comprising a guide bracket having an opening, a guide opening in the top of the body aligned therewith, an elongated rod mounted within the body having its lower part normally resting on said door and extending through said openings of the bracket and the top of the body for movement longitudinally in a downwardly inclined rectilinear path from an inactive position above the ingress opening to an active position across the ingress opening, in which the upper end of the rod extends through the guide opening in the top of the body and the lower end of said rod rests between the door and the treadle to secure the door against movement in an arcuate path.

FLOYD SMITH JONES.

References Cited in the file of this patent

UNITED STATES PATENTS

| Number | Name | Date |
|---|---|---|
| 24,771 | Wetmore | July 12, 1859 |
| 60,143 | Clarke | Dec. 4, 1866 |
| 344,551 | Snell | June 29, 1886 |
| 624,665 | Lewis | May 9, 1899 |
| 1,423,715 | Hedberg | July 25, 1922 |
| 1,507,639 | Waddell et al. | Sept. 9, 1924 |
| 1,760,324 | Slater | May 27, 1930 |